United States Patent
Ogden et al.

(10) Patent No.: US 9,314,836 B2
(45) Date of Patent: Apr. 19, 2016

(54) WEAR CRUTCHES FOR LINKING MEMBERS

(75) Inventors: Glen John Ogden, Emerald (AU); Gregory James Agnew, Aitkenvale (AU)

(73) Assignees: DAVID SCOTT HOLDINGS PTY LTD, Emerald, Queensland (AU); Glen John Ogden, Emerald (AU)

( * ) Notice: Subject to any disclaimer, the term of this patent is extended or adjusted under 35 U.S.C. 154(b) by 90 days.

(21) Appl. No.: 13/819,030

(22) PCT Filed: Aug. 26, 2011

(86) PCT No.: PCT/AU2011/001111
§ 371 (c)(1),
(2), (4) Date: May 8, 2013

(87) PCT Pub. No.: WO2012/024743
PCT Pub. Date: Mar. 1, 2012

(65) Prior Publication Data
US 2013/0219851 A1    Aug. 29, 2013

(30) Foreign Application Priority Data
Aug. 27, 2010 (AU) .................................. 2010214684

(51) Int. Cl.
| F16G 15/00 | (2006.01) |
| B21L 99/00 | (2009.01) |
| F16G 17/00 | (2006.01) |
| B21L 9/08 | (2006.01) |
| E02F 3/58 | (2006.01) |

(52) U.S. Cl.
CPC . *B21L 99/00* (2013.01); *B21L 9/08* (2013.01); *E02F 3/58* (2013.01); *F16G 17/00* (2013.01)

(58) Field of Classification Search
CPC ........... F16G 17/00; B21L 99/00; B21L 9/08; E02F 3/58
USPC ...................................... 59/78, 84, 90, 91, 93
See application file for complete search history.

(56) References Cited

U.S. PATENT DOCUMENTS

| 729,611 A | * | 6/1903 | Lane .................................. 54/50 |
| 3,028,725 A | * | 4/1962 | Stevens ............................. 59/84 |

(Continued)

FOREIGN PATENT DOCUMENTS

| AU | 646366 B | 12/1993 |
| GB | 786972 A | 11/1957 |

OTHER PUBLICATIONS

International Search Report for PCT/AU2011/001111, mailed Dec. 22, 2011; ISA/AU.

*Primary Examiner* — David B Jones
(74) *Attorney, Agent, or Firm* — Harness, Dickey & Pierce, P.L.C.

(57) ABSTRACT

A link member with wear crutch, the linking member including a pair of side arms and at least one integrally formed loop end portion, the inner surfaces of the side arms and loop end portion defining a friction surface, the inner surfaces of the respective side arms diverging from one another away from the loop end portion and the wear crutch including two curved surfaces arranged as an outer and an inner surface, the outer surface to abut a surface of the linking member in a loop end portion and the inner surface presenting a wear surface for the linking member, and whereby the outer and inner surfaces intersect one another at opposite ends of the wear crutch along common edge portions, and a pair of substantially parallel locating arms adapted to abut respective surfaces of the linking member such that said common edge portions each engage an adjacent arm in a substantially flush manner when the wear crutch is seated on the linking member.

16 Claims, 11 Drawing Sheets

(56) References Cited

U.S. PATENT DOCUMENTS

| | | | |
|---|---|---|---|
| 3,055,168 A * | 9/1962 | Towry | 59/84 |
| 3,224,185 A * | 12/1965 | Grim et al. | 59/86 |
| 3,739,571 A | 6/1973 | Lashar, Jr. | |
| 5,647,198 A * | 7/1997 | Mihailovic | 59/86 |
| 8,628,054 B2 * | 1/2014 | Kaybidge et al. | 248/580 |

* cited by examiner

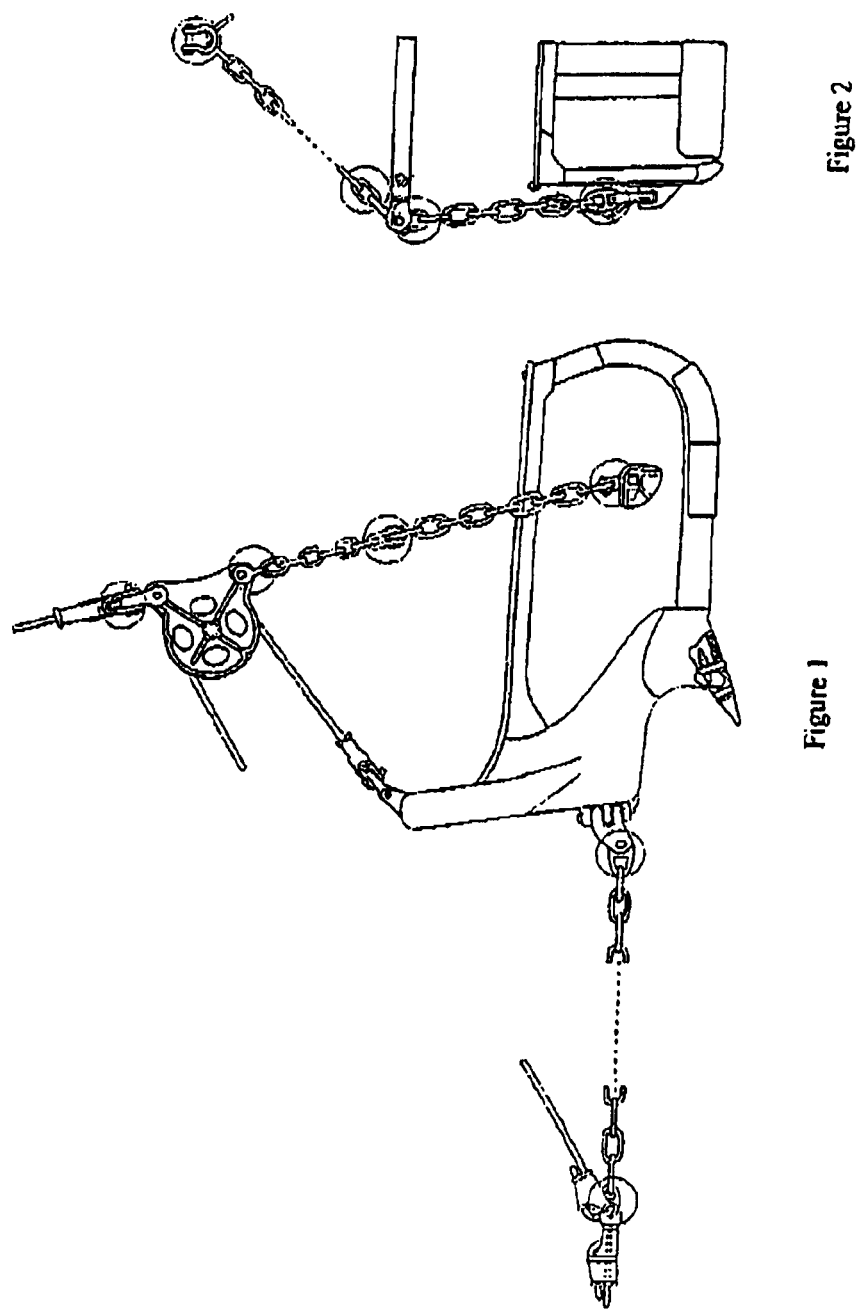

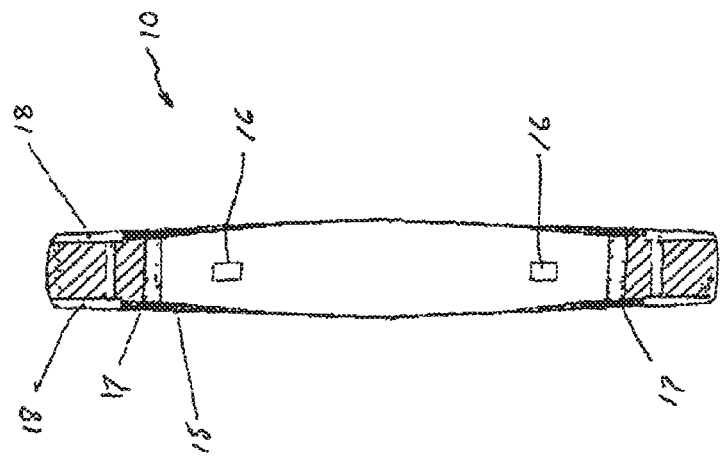
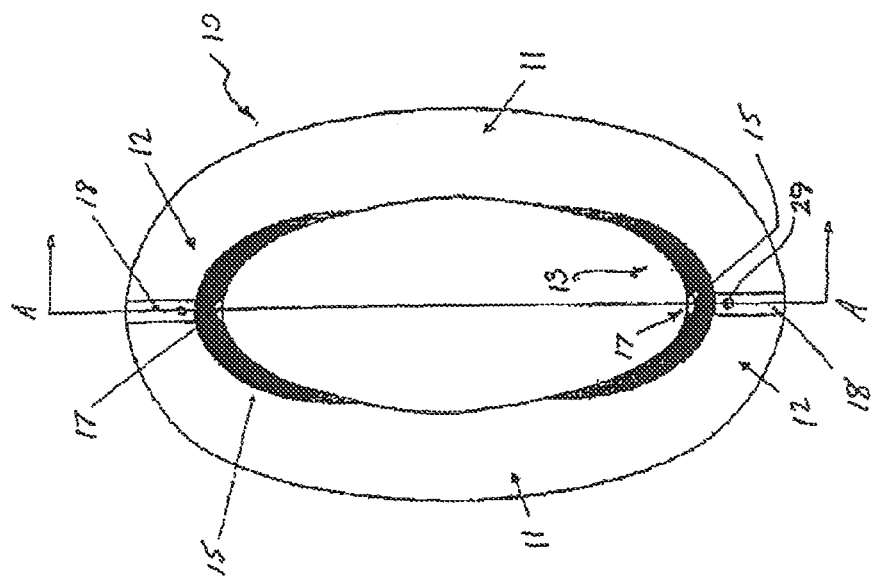

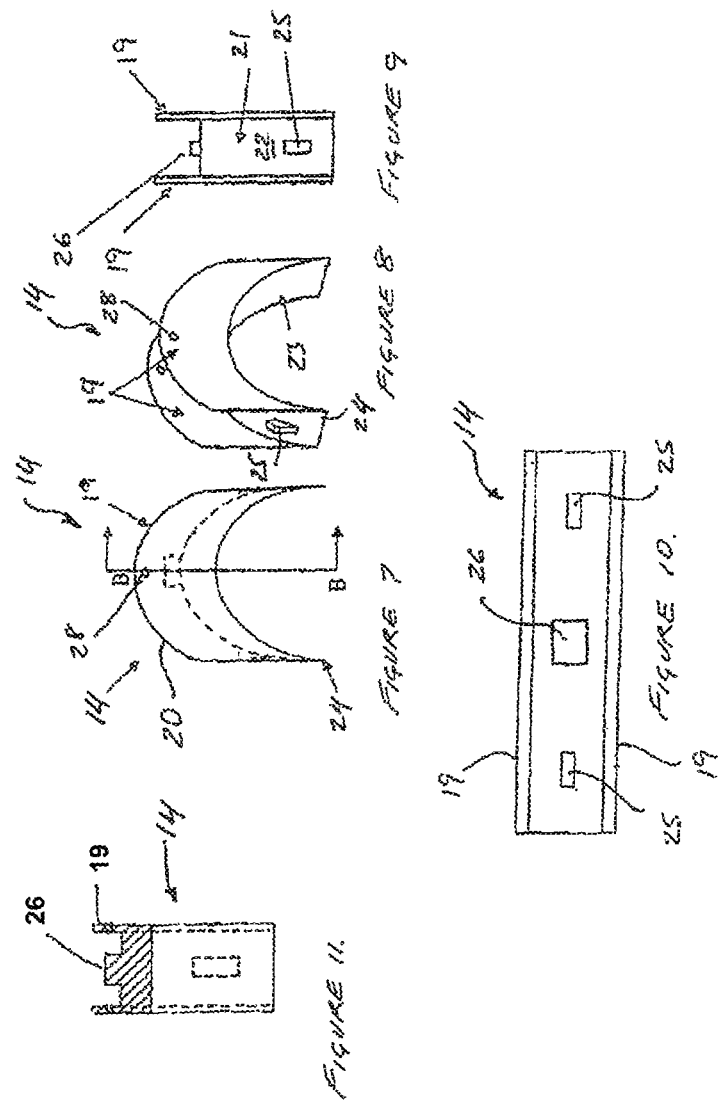

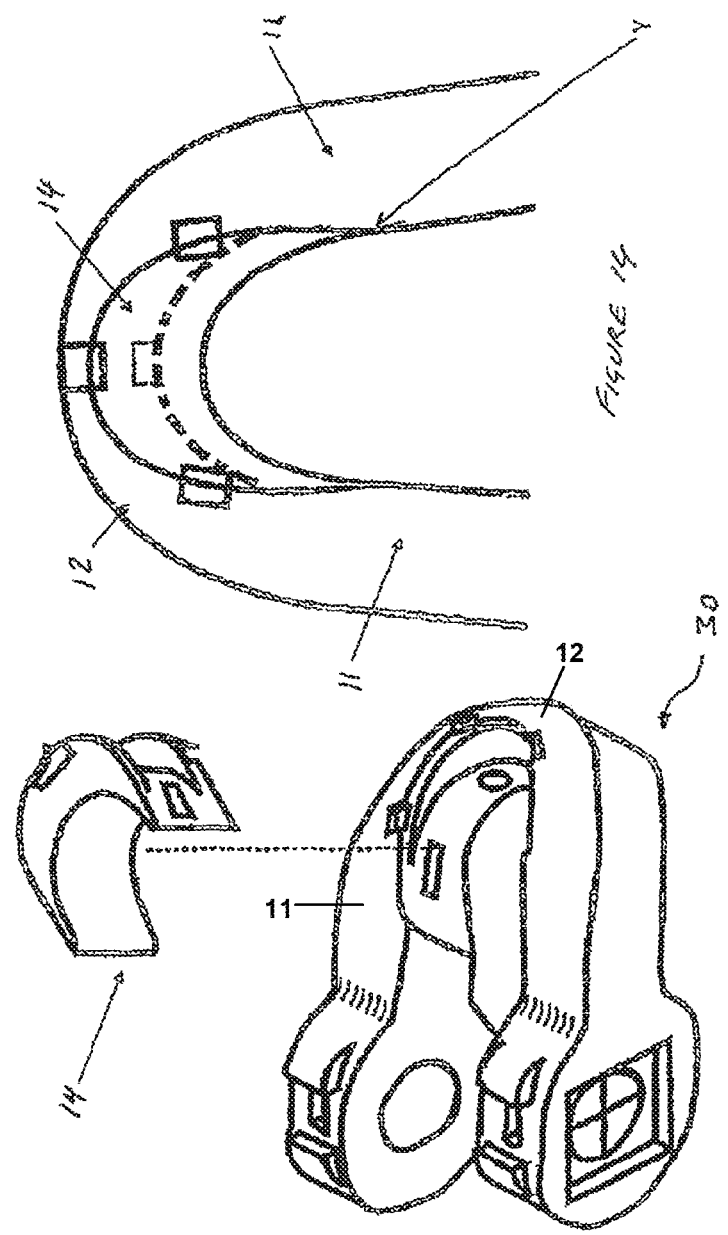

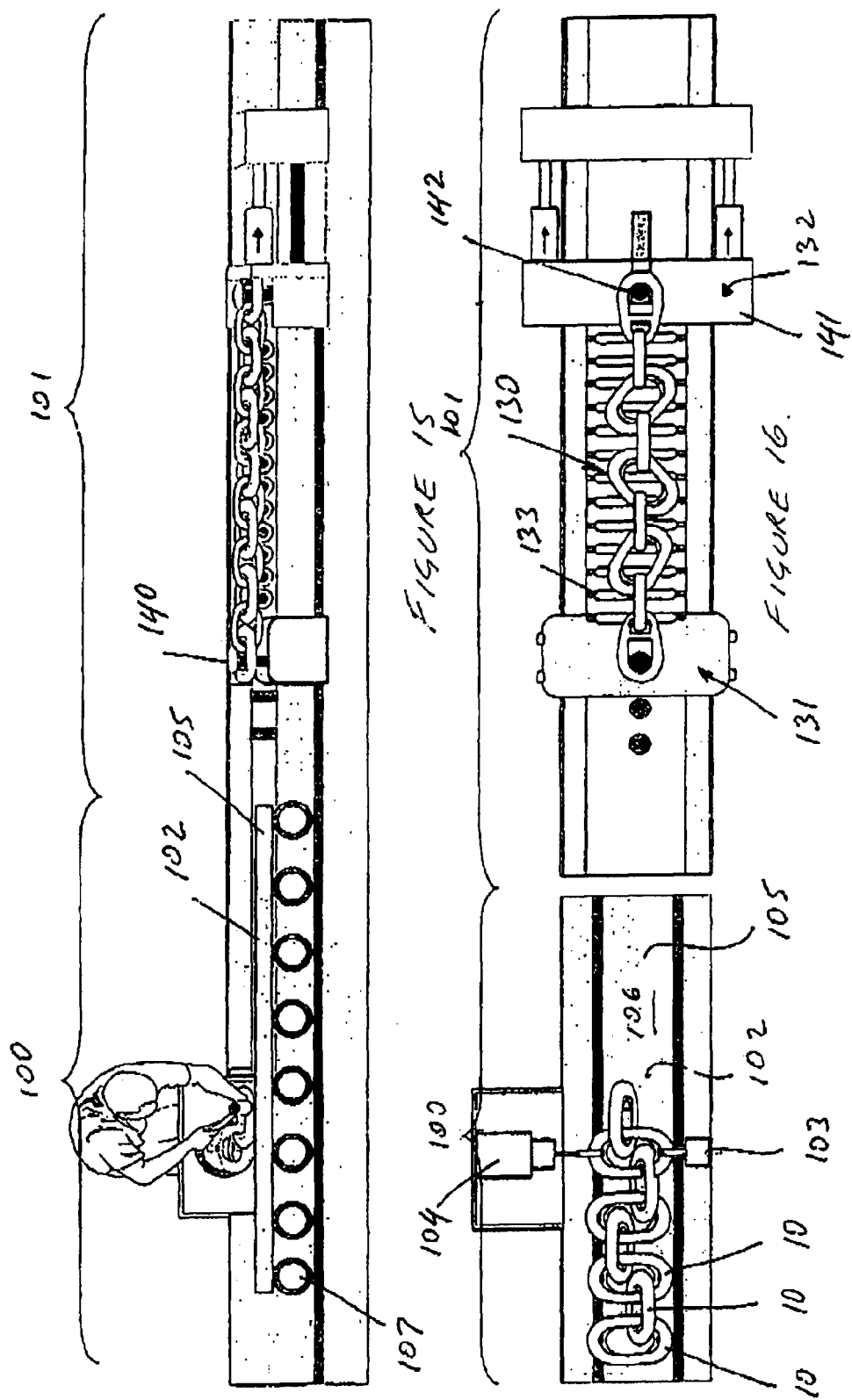

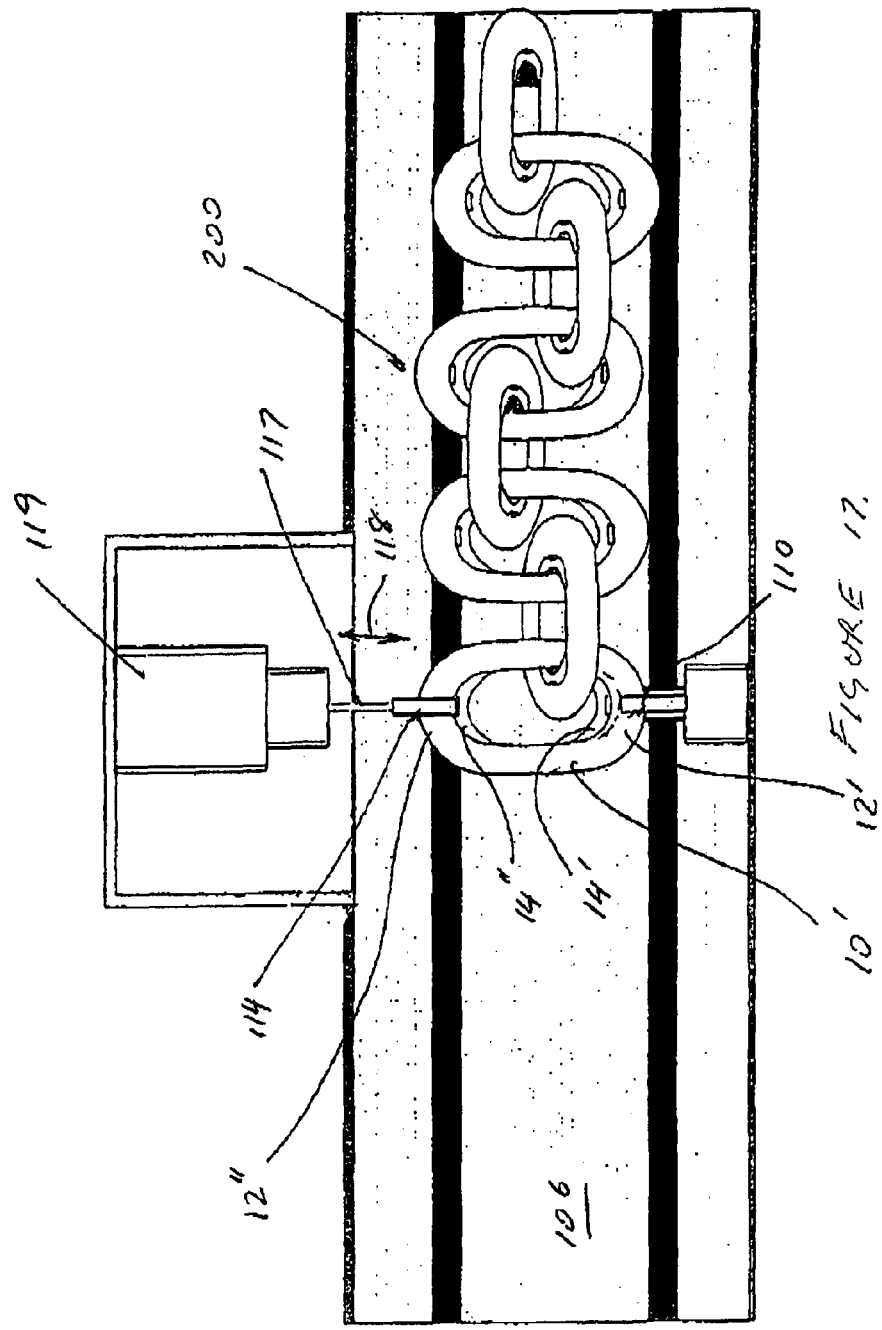

WEAR CRUTCHES FOR LINKING MEMBERS

CROSS-REFERENCE TO RELATED APPLICATIONS

This application is a 371 U.S. National Stage of International Application No. PCT/AU2011/001111, filed on Aug. 26, 2011, which claims priority to Australian Patent Application No. 2010214684 filed on Aug. 27, 2010, the contents of which applications are hereby incorporated by reference in their entirety as if fully set forth herein.

FIELD OF THE INVENTION

The present invention relates to improvements to linking members, including wear crutches for linking members.

BACKGROUND ART

Chains and other linking devices, such as shackles, have portions or points which during use are subjected to significant amounts of wear. For example, linking members, including shackles and individual links of chains, operatively connected to a bucket of a dragline, such as that illustrated in FIGS. 1 and 2, have multiple wear points that as a consequence of use experience considerable wear.

Previously when one or more linking members of a chain exhibited considerable wear, the entire chain was removed so that the chain could be transported to a work shop, typically located a considerable distance from the dragline, where persons would grind off what remained of the existing wear crutches and welded new wear crutches into place. This is illustrated in FIG. 3.

The process for rebuilding wear crutches typically involved laying the chain on a bench, gouging out selected portions of each link where required, and preheating the links to a temperature of approximately 200° C. before welding individual pieces of metal rod to each link so as to replace the thickness of the portion of said link that had been worn away on one side of each link.

Instead of the links being arranged generally end to end, every second link was rotated approximately 90 degrees about an axis passing through an opening in said rotated link that was orthogonal to said link's longitudinal and transverse axes. This allowed persons to work on rebuilding wear crutches of adjacent links without additional movement of the links relative to one another.

Once the wear crutches had been rebuilt on one side of each link, the chain was rolled over so as to expose the opposite side of each link. The aforementioned process of rebuilding wear crutches was then repeated for the then exposed side of each link.

After all of the links had been rebuilt, they were typically gouged back to the original shape of a new crutch. The process to this point typically took approximately 9 to 10 hours to complete.

After the gouging process had been completed, a grinding process was typically employed to clean up the crutch area. The chains were then dye checked for cracks. If any cracks were found, the area surrounding the crack was gouged and rebuilt in a manner as previously described.

The time taken to check the rebuilt links and to rebuild those links that exhibited cracks often took an additional three or four hours to complete.

New chains typically last around eight weeks when used 24 hours a day, seven days a week before requiring their first rebuild. A hoist chain typically undergoes approximately eight rebuilds before it is scrapped. A rebuilt chain lasts around four weeks due to the weld material being softer than new chain material. Some mines wear the chains to destruction and don't rebuild the chains.

Instead, they replace destroyed chains with new chains every four to five months at a cost of approximately $14,000 per chain and two chains per machine.

There are numerous disadvantages with the existing method of rejuvenating or repairing chain links and other linking members that are provided with wear crutches. Most notably, the existing method is very time consuming and, as a consequence, rather expensive.

Further chain rebuilds need to be monitored constantly in case of cracking or the crutch wearing unevenly. Lastly, the capacity of a rebuilt chain to withstand wear is typically lower than that of a new chain due to the hardness of the weld material being around 240 bn which is much less than the hardness of the original chain, which is typically 300 bn.

SUMMARY OF THE INVENTION

It is therefore an object of the present invention to provide an improved linking member and an improved wear crutch for a linking member which alleviate at least some of the deficiencies of the prior art and which will be reliable and efficient in use.

In one aspect, this invention relates to a wear crutch for a linking member of the type having two opposing arms that are interconnected by an intermediate looped end portion, said wear crutch including:

two opposing guides connected by an intermediate wear body, said wear body having a first or outer, curved, surface and a second or inner, curved surface, said outer and inner curved surfaces being located on opposite sides of said body, and whereby said two curved surfaces intersect one another at opposite ends of said body along common edge portions, said common edge portions and said outer surface being located between said guides, said guides being substantially perpendicular to a plane containing said edge portions, whereby in use said inner and outer curved surfaces define a wear thickness there between, said outer surface shall bear against the looped end portion of the linking member, said edge portions each engage an adjacent arm in a substantially flush manner, and whereby said guides assist in the location of said wear body relative to the loop end portion that is located there between.

In another aspect this invention relates to an improved linking member, said linking member including:

two opposing arms that are interconnected by an intermediate looped end portion and whereby respective inner surfaces of said arms and an inner surface of said loop end portion define a friction surface, and a wear crutch having two opposing guides connected by an intermediate wear body, said wear body having a first curved surface and a second curved surface, said first and second curved surfaces being located on opposite sides of said wear body, and whereby said two curved surfaces intersect one another at opposite ends of said wear body along common edge portions, said common edge portions and said first curved surface being located between said guides whereby in use said second and first curved surfaces define a wear thickness there between and said first surface shall bear against said inner surface of said looped end portion, said edge portions shall each engage a respective one of said adjacent arm members in a manner whereby adjacent edge portions and inner surfaces are substantially flush, and whereby said guides assist in the location of said wear body relative to said loop end portion that is located there between.

The wear crutch of the preferred embodiment is normally substantially U-shaped when viewed in plan. The wear crutch typically has two curved or arcuate surfaces arranged as an outer and an inner surface with the outer surface intended to abut a surface of the linking member in a loop end portion and the inner surface presenting a wear surface for the linking member.

Normally, the linking member will have an opening defined by one or more portions of the linking member and the wear crutch will be received at least partially within this opening against a loop end portion of the linking member.

The inner and outer surfaces of the wear crutch are each typically substantially semicircular albeit of different radii in order that the inner and outer surfaces converge to meet each other at free ends of the wear crutch. Typically, there are two free ends which are substantially pointed.

The different arcs of the inner and outer surfaces also result in the creation of a wear thickness between the two surfaces which typically thins towards the free ends and thickens towards the peak of the wear crutch.

The inner and outer surfaces may be curved or arcuate in two directions in order to substantially match or recreate the partially toroidal shape of the linking member.

Alternatively, the inner surface may be partially toroidal and the outer surface may be arcuate in a single direction only for ease of manufacture with the portion of the linking member similarly flattened to correspond.

Typically, the wear crutch may be manufactured of material which is of greater hardness than the linking member material.

Preferably, the wear crutch will be thicker at the peak and the thickness diminishes towards each free end. Normally in use, the wear or load applied at the peak of the linking member and therefore at the peak of the wear crutch, will be greater than that applied toward each free end. Therefore, the wear crutch will provide the linking member with a replaceable wear portion.

The wear crutch preferably includes two opposing, substantially parallel, locating arms or guides adapted to abut respective surfaces of the linking member. Typically, the guides are each contained in a respective plane that is perpendicular to a plane containing the axes of the inner and outer surfaces. Normally, the guides or locating arms extend over a portion of the loop end of the linking member in order to locate the wear crutch relative to the linking member.

Although the guides or locating arms can have any shape, they are typically at least partially annular. Typically, the locating arms are substantially planar but may be curved or include a curved portion in order to match the linking member more closely.

Typically, the guides or locating arms in combination with the outer surface define a U-shaped or C-shaped channel into which the loop end portion of the linking member is at least partially received. Normally, the linking member is closely received within this channel with portions of the channel abutting the respective portions of the linking member.

The locating arms may be formed separately to the wear crutch but typically, will be formed integrally with the remainder of the wear crutch.

One or more locating means may be provided in the channel. The locating means may preferably be or include either a protrusion, such as a pin or key that stands proud of the outer surface of the wear crutch or alternatively, may include a recess formed in said outer surface that is capable of receiving a protrusion, such as a pin or key. One or more corresponding recesses or protrusions will typically be provided on the surface of the linking member in order to positively locate the wear crutch relative to the linking member. This will assist with the proper location of the wear crutch during repair and also at least temporarily locate the wear crutch relative to the linking member during the initial stages of the bedding process.

Normally, multiple locating means are provided, one at the peak and at least one on either side of the peak as this has been found to not only spread the load applied on the locating means but also prevent accidental movement of the wear crutch during the repair process. The locating means may be of different shapes or configurations according to their respective locations.

Locating means may be provided on the locating arms as well as, or instead of, on the outer surface.

As mentioned above, the free ends of the wear crutch are typically tapered to a point. When properly located on the linking member, the respective free ends of the wear crutch will typically be flush with an inner surface of the respective side arms of the linking member. The linking member used with the wear crutch of the present invention may have a specific configuration in order to ensure this flush fit. By providing a flush fit with an inner surface of the linking member, wear points are reduced as much as possible.

The preferred linking member used according to the present invention typically has features corresponding to the features of the preferred wear crutch.

The linking member may be of any type. For example, the linking member may be a chain link or a shackle.

Normally, a chain link has a pair of side arms with a pair of loop end portions linking each of the side arms.

A shackle typically has a pair of side arms with a single loop end linking one end only of the side arms with the other end of side arms adapted to receive a pawl to open and close the shackle.

According to a preferred embodiment, the inner surface of at least one loop end portion of the linking member is provided with an upper and lower shaped rebate.

Typically, the rebate will be substantially crescent shaped and typically provided on each of an upper and lower surface of the linking member at the loop end portion. Normally, the rebate will extend from a location on each of the side arms and about the loop end. The rebate will normally be provided in matched pairs on the upper and lower surface of the linking member.

As mentioned previously, one or more locating means may be provided in or on the linking member coincident with the rebate. The locating means may preferably be either a protrusion, such as a pin or key, standing proud of the outer surface of the wear crutch or alternatively, may be a recess into which a protrusion such as a pin or key may be located. One or more corresponding recesses or protrusions will typically be provided on the surface of the linking member in order to positively locate the wear crutch relative to the linking member. This will assist with the proper location of the wear crutch during repair and also at least temporarily locate the wear crutch relative to the linking member during the bedding process.

According to a particularly preferred embodiment, the inner surfaces of the respective side arms of the linking member preferably diverge from one another from the loop end portion. Each of the inner surfaces therefore typically defined a wear surface as well. Normally, the diverging inner surfaces of the side arms are preferred over substantially parallel inner surfaces of side arms.

The side arms themselves may diverge, forming a linking member which is of increased dimension away from the loop end portion or alternatively (and less preferred), an outer surface of the side arms may be substantially parallel with one another with only the inner surfaces diverging.

In the case of a chain link, the mid-point along the length of the chain link may therefore be wider and/or the side arms thicker than the loop end portion.

On a shackle, the free ends of side arms may be wider and/or thicker than the loop end portion.

Preferably, a recess or notch or channel may be provided in a loop end portion extending across the thickness of the loop end at the peak of the loop end portion from the outer surface of the loop end portion to the inner surface of the loop end portion. Preferably, a recess or notch or channel will be provided on both the top and the bottom of the loop end portion.

Preferably, the opening or notch or channel will intersect or meet the rebate where provided. The opening or notch or channel may of different depth to the rebate, preferably deeper.

In still yet another aspect, this invention relates to a linking member for use in conjunction with a wear crutch of the type having two opposing guides connected by an intermediate wear body, said wear body having a first or outer, curved surface and a second or inner, curved surface, said outer and inner curved surfaces being located on opposite sides of said body, and whereby said two curved surfaces intersect one another at opposite ends of said body along common edge portions, said common edge portions and said outer surface being located between said guides whereby in use said inner and outer curved surfaces define a wear thickness there between, said linking member including:

two opposing arms that are interconnected by an intermediate looped end portion and whereby respective inner surfaces of said arms and said loop end portion define a friction surface, characterised in that said inner surfaces of said arms diverge outwardly from said inner surface of said loop end portion such that when the wear crutch is fitted to said link member the outer surface of the wear crutch shall bear against said inner surface of said looped end portion and the edge portions shall each engage said adjacent arm such that respective edge portions and said adjacent inner surfaces of said arm members are substantially flush, and whereby the guides assist in the location of the wear body relative to said loop end portion that is located there between.

Preferably the enclosed angle between opposing arms is approximately 20 degrees.

In still yet another aspect, this invention relates to a crutch displacement apparatus for assisting with the removal of a wear crutch that is mounted on a linking member, said linking member having two opposing arm members that are interconnected by an intermediate looped end portion, and whereby said wear crutch includes two opposing guides connected by an intermediate wear body, said wear body having a first curved surface and a second curved surface, said first and second curved surfaces being located on opposite sides of said wear body, and whereby said two curved surfaces intersect one another at opposite ends of said wear body along common edge portions, said common edge portions and said first curved surface being located between said guides and whereby when said wear crutch is mounted on said linking member said first curved surface bears against said inner surface of said looped end portion and said edge portions each engage a respective one of said adjacent arm members in a manner whereby adjacent edge portions and inner surfaces are substantially flush and whereby said guides assist in the location of said wear body relative to said looped end portion that is located there between, said crutch removal apparatus including:

displacement support means capable of providing support for at least one linking member during a crutch displacement operation;

linking member restraining means associated with said support means for preventing movement of the linking member relative to said support means, and at least one crutch displacement tool associated with said support means and/or said restraining means, said crutch displacement tool being adapted to at least displace the wear crutch that is mounted on the linking member while the linking member is supported by said support means and restrained from movement relative to said support means by said restraining means.

The linking member restraining means may include first and second linking member engaging portions that are adapted to engage opposing portions of the linking member. Further, in one embodiment the first linking member engaging portion may form part of the crutch displacement tool.

Where the linking member includes two opposing wear crutches, the first linking member engaging portion may form part of a first crutch displacement tool and the second linking member engaging portion may form part of a second crutch displacement tool.

Preferably the or each crutch displacement tool includes at least one wear crutch engaging portion that in use may engage a selected portion of the wear crutch, such as an edge portion of at least one guide. For example, the looped end portion of the linking member may include a recess formed in a side wall thereof and whereby in use said recess may serve to guide the wear crutch engaging portion between a first, non-engaging, position and a second position whereby the engaging portion engages the wear crutch.

Preferably the wear crutch engaging portion is mounted on an extendable ram, such as a hydraulic or a pneumatic ram. Further, the ram may be mounted on either the support means or the restraining means.

Preferably the crutch displacement tool includes two opposing wear crutch engaging portions that in use shall simultaneously engage respective opposing portions of the same wear crutch.

In one embodiment, the crutch displacement apparatus may include two opposing crutch displacement tools that are arranged such that they may each engage an adjacent wear crutch and whereby actuation of one or both crutch displacement tools may result in the displacement of one or both wear crutches.

For example, in one embodiment, during the displacement operation, the first crutch displacement tool is capable of movement relative to the displacement support means in a manner that shall cause the displacement of the wear crutch that it has engaged but whereby the second crutch displacement tool is restrained from movement relative to the displacement support apparatus. Displacement of the second wear crutch by the second crutch displacement tool shall occur after the first wear crutch has been displaced and as a consequence of a force applied to the linking member by the advancing first crutch displacement tool.

In another embodiment, during the displacement operation both the first and second displacement tools are capable of movement relative to the displacement support means in a manner that shall cause the wear crutches that they have engaged to be displaced.

To assist with the movement of the linking member or linking members on the displacement support means, the support means may include a plurality of individual supports that are capable of performing a rolling motion and whereby the or at least some of the linking members are supported by one or more support elements. For example, the support means may be a table or bench having a peripheral frame and a plurality of elongate, cylindrically shaped, rollers that are suspended between opposing frame members.

In still yet another aspect, this invention relates to a crutch bedding apparatus for assisting with the bedding of a wear crutch that is already partially located on a linking member, said linking member having two opposing arm members that are interconnected by an intermediate looped end portion, and whereby said wear crutch includes two opposing guides connected by an intermediate wear body, said wear body having a first curved surface and a second curved surface, said first and second curved surfaces being located on opposite sides of said wear body, and whereby said two curved surfaces intersect one another at opposite ends of said wear body along common edge portions, said common edge portions and said first curved surface being located between said guides and whereby when said wear crutch is mounted on said linking member said first curved surface bears against said inner surface of said looped end portion and said edge portions each engage a respective one of said adjacent arm members in a manner whereby adjacent edge portions and inner surfaces are substantially flush and whereby said guides assist in the location of said wear body relative to said looped end portion that is located there between, said crutch bedding apparatus including:

bedding support means for supporting at least one linking member during a crutch bedding operation;

first linking member engagement means that is adapted to engage either a portion of the linking member or a wear crutch that is associated with the linking member when the linking member is supported on said bedding support means;

second linking member engagement means that is capable of engaging either another portion of the same linking member and/or a wear crutch associated with said other portion, or another linking member connected to the first linking member and/or a wear crutch associated with that other linking member, and separating means for increasing the distance separating said first linking member engagement means and said second linking member engagement means whereby in use a force may be applied to the linking member or all of the linking members located between said first and said second linking member engagement means sufficient to bed the wear crutch or all of the wear crutches that are partially located on the linking members by increasing the distance separating said first linking member engagement means and said second linking member engagement means.

In one embodiment the first linking member engagement means may be fixed relative to the bedding support means and the second linking member engagement means is capable of movement relative to both said first linking member engagement means and said bedding support means. In another embodiment, both the first and second linking member engagement means may move relative to the bedding support means.

To assist with the movement of the linking member or linking members on the bedding support means, the support means may include a plurality of individual supports that are capable of performing a rolling motion and whereby the or at least some of the linking members are supported by one or more support elements. For example, the bedding support means may be a table or bench having a peripheral frame and a plurality of elongate, cylindrically shaped, rollers that are suspended between opposing frame members.

In still yet another aspect, this invention relates to a combined crutch displacement and crutch bedding apparatus for assisting with the removal and replacement of a wear crutch that is mounted on a linking member and the subsequent bedding of a replacement wear crutch that is already partially located on the linking member, said linking member having two opposing arm members that are interconnected by an intermediate looped end portion, and whereby said wear crutch includes two opposing guides connected by an intermediate wear body, said wear body having a first curved surface and a second curved surface, said first and second curved surfaces being located on opposite sides of said wear body, and whereby said two curved surfaces intersect one another at opposite ends of said wear body along common edge portions, said common edge portions and said first curved surface being located between said guides and whereby when said wear crutch is mounted on said linking member said first curved surface bears against said inner surface of said looped end portion and said edge portions each engage a respective one of said adjacent arm members in a manner whereby adjacent edge portions and inner surfaces are substantially flush and whereby said guides assist in the location of said wear body relative to said looped end portion that is located there between, said combined crutch displacement and crutch bedding apparatus including:

displacement support means capable of providing support for at least one linking member during a crutch displacement operation;

linking member restraining means associated with said support means for preventing movement of the linking member relative to said support means;

at least one crutch displacement tool associated with said support means and/or said restraining means, said crutch displacement tool being adapted to at least displace the wear crutch that is mounted on the linking member while the linking member is supported by said support means and restrained from movement relative to said support means by said restraining means;

bedding support means for supporting at least one linking member during a crutch bedding operation;

first linking member engagement means that is adapted to engage either a portion of the linking member or a wear crutch that is associated with the linking member when the linking member is supported on said bedding support means;

second linking member engagement means that is capable of engaging either another portion of the same linking member and/or a wear crutch associated with said other portion, or another linking member connected to the first linking member and/or a wear crutch associated with that other linking member, and separating means for increasing the distance separating said first linking member engagement means and said second linking member engagement means whereby in use a force may be applied to the linking member or all of the linking members located between said first and said second linking member engaging means sufficient to bed the wear crutch or all of the wear crutches that are partially located on the linking members by increasing the distance separating said first linking member engagement means and said second linking member engagement means.

In one embodiment the displacement support means and the bedding support means may be the same.

In still yet another aspect, this invention relates to a method of displacing a wear crutch that is mounted on a linking member, said method including:

providing a crutch displacement apparatus of the type described above;

placing the linking member on the linking member support means;

employing the linking member restraining means to prevent movement of the linking member relative to the displacement support means during the displacement of the wear crutch, and actuating the crutch displacement tool whereby engagement of the crutch displacement tool with the wear crutch shall result in the displacement of said wear crutch relative to the restrained linking member.

Where it is desirous to displace the wear crutches associated with a plurality of interconnected linking members, such as a chain, the linking members may be arranged on the displacement support means in a manner whereby adjacent links are substantially orthogonal and whereby the crutch displacement tool may be used to displace the wear crutches of every second linking member. Once completed, the linking members may each be re-arranged on the displacement support means so that displacement process may be repeated in respect of the remaining wear crutches of every second linking member.

In still yet another aspect, this invention relates to a method of bedding a wear crutch on a linking member, said bedding method including:

providing a crutch bedding apparatus of the type described above;

laying a linking member on the bedding support means, said linking member having a first, looped, end portion, an opposing second end portion, and a wear crutch partially located against said looped end portion;

engaging the wear crutch with either the first linking member engagement means or the second linking member engagement means;

engaging the second end portion of the linking member with which ever linking member engagement means that is not engaging the wear crutch, and actuating the separating means so that the two link member engagement means are urged apart and whereby forces are applied to the wear crutch and the second end portion sufficient to bed the wear crutch against the first, looped, end portion of the linking member.

Where it is desirous to bed the wear crutches associated with a plurality of interconnected linking members, such as a chain, the linking members may be arranged lengthwise on the bedding support means and whereby the first linking member shall engage the first linking member engagement means and the last linking member shall engage the second linking member engagement means and, by urging the two linking member engagement means further apart it is possible using the forces transmitted to all of the linking members by said linking member engagement means to bed multiple wear crutches on different linking members simultaneously.

In still yet another aspect, this invention relates to an improved linking member and a crutch displacement apparatus for assisting with the removal of a wear crutch that is mounted on the linking member, including:

a linking member having two opposing arm members that are interconnected at one end by an intermediate looped end portion and at an opposing end by a second end portion;

a wear crutch having two opposing guides connected by an intermediate wear body, said wear body having a first curved surface and a second curved surface, said first and second curved surfaces being located on opposite sides of said wear body, and whereby said two curved surfaces intersect one another at opposite ends of said wear body along common edge portions, said common edge portions and said first curved surface being located between said guides and whereby when said wear crutch is mounted on said linking member said first curved surface bears against said inner surface of said looped end portion and said edge portions each engage a respective one of said adjacent arm members in a manner whereby adjacent edge portions and inner surfaces are substantially flush and whereby said guides assist in the location of said wear body relative to said looped end portion that is located there between;

a crutch removal apparatus having displacement support means capable of providing support for said linking member during a crutch displacement operation;

linking member restraining means associated with said support means, and at least one crutch displacement tool associated with said support means and/or said restraining means, whereby said crutch displacement tool is in engagement with said wear crutch and said restraining means is in engagement with said second end portion of said linking member.

In still yet another aspect, this invention relates to an improved linking member and a crutch bedding apparatus for assisting with the bedding of a wear crutch that is partially located on the linking member, including:

a linking member having two opposing arm members that are interconnected at one end by an intermediate looped end portion and an opposing end by a second end portion;

a wear crutch having two opposing guides connected by an intermediate wear body, said wear body having a first curved surface and a second curved surface, said first and second curved surfaces being located on opposite sides of said wear body, and whereby said two curved surfaces intersect one another at opposite ends of said wear body along common edge portions, said common edge portions and said first curved surface being located between said guides and whereby when said wear crutch is mounted on said linking member said first curved surface bears against said inner surface of said looped end portion and said edge portions each engage a respective one of said adjacent arm members in a manner whereby adjacent edge portions and inner surfaces are substantially flush and whereby said guides assist in the location of said wear body relative to said looped end portion that is located there between;

first linking member engagement means;

second linking member engagement;

bedding support means for supporting said linking member during a crutch bedding operation, and separating means for increasing the distance separating said first linking member engagement means and said second linking member engagement means, and whereby said wear crutch is engaged with either said first linking member engagement means or said second linking member engagement means while said second end portion is operatively connected to which ever linking member engagement means that is not engaged with said wear crutch.

In still yet another aspect, this invention relates to a chain that includes;

a linking member having two opposing arms that are interconnected by an intermediate looped end portion and whereby respective inner surfaces of said arms and an inner surface of said loop end portion define a friction surface, and a wear crutch having two opposing guides connected by an intermediate wear body, said wear body having a first curved surface and a second curved surface, said first and second curved surfaces being located on opposite sides of said wear body, and whereby said two curved surfaces intersect one another at opposite ends of said wear body along common edge portions, said common edge portions and said first curved surface being located between said guides whereby in use said second and first curved surfaces define a wear thickness there between and said first surface shall bear against said inner surface of said looped end portion, said edge portions shall each engage a respective one of said adjacent arm members in a manner whereby adjacent edge portions and inner surfaces are substantially flush, and whereby said guides assist in the location of said wear body relative to said loop end portion that is located there between.

BRIEF DESCRIPTION OF THE DRAWINGS

Various embodiments of the invention will be described with reference to the following drawings, in which:

FIG. 1 is a side view of a drag line bucket with associated chain rigs indicating the usual wear points in addition to the chain links;

FIG. 2 is a sectional end view of the dragline bucket illustrated in FIG. 1;

FIG. 4 is a front view of a chain-link constructed in accordance with the present invention and whereby shading has been used to show recesses;

FIG. 5 is a sectional side view of the chain link illustrated in FIG. 4 along line A-A;

FIG. 7 is a front view of one of the wear crutches shown in FIG. 6;

FIG. 8 is a pictorial view of the wear crutch illustrated in FIG. 7;

FIG. 9 is a side view of the wear crutch illustrated in FIG. 7;

FIG. 10 is a bottom view of the wear crutch illustrated in FIG. 7;

FIG. 11 is a sectional side view of the wear crutch illustrated in FIG. 7 along line B-B;

FIG. 13 is an exploded view of a shackle and wear crutch according to a preferred embodiment of the present invention;

FIG. 14 is a front view of a loop end of the shackle with wear crutch mounted thereon as shown in FIG. 12;

FIG. 15 is a sectional side view of a combination wear crutch displacement apparatus and wear crutch bedding apparatus, both of which are constructed in accordance with the present invention;

FIG. 16 is a plan view of the combination wear crutch displacement apparatus and wear crutch bedding apparatus shown in FIG. 15;

FIG. 17 is a plan view of the wear crutch displacement apparatus shown in FIG. 15;

DETAILED DESCRIPTION OF THE PREFERRED EMBODIMENT

Figure 3:
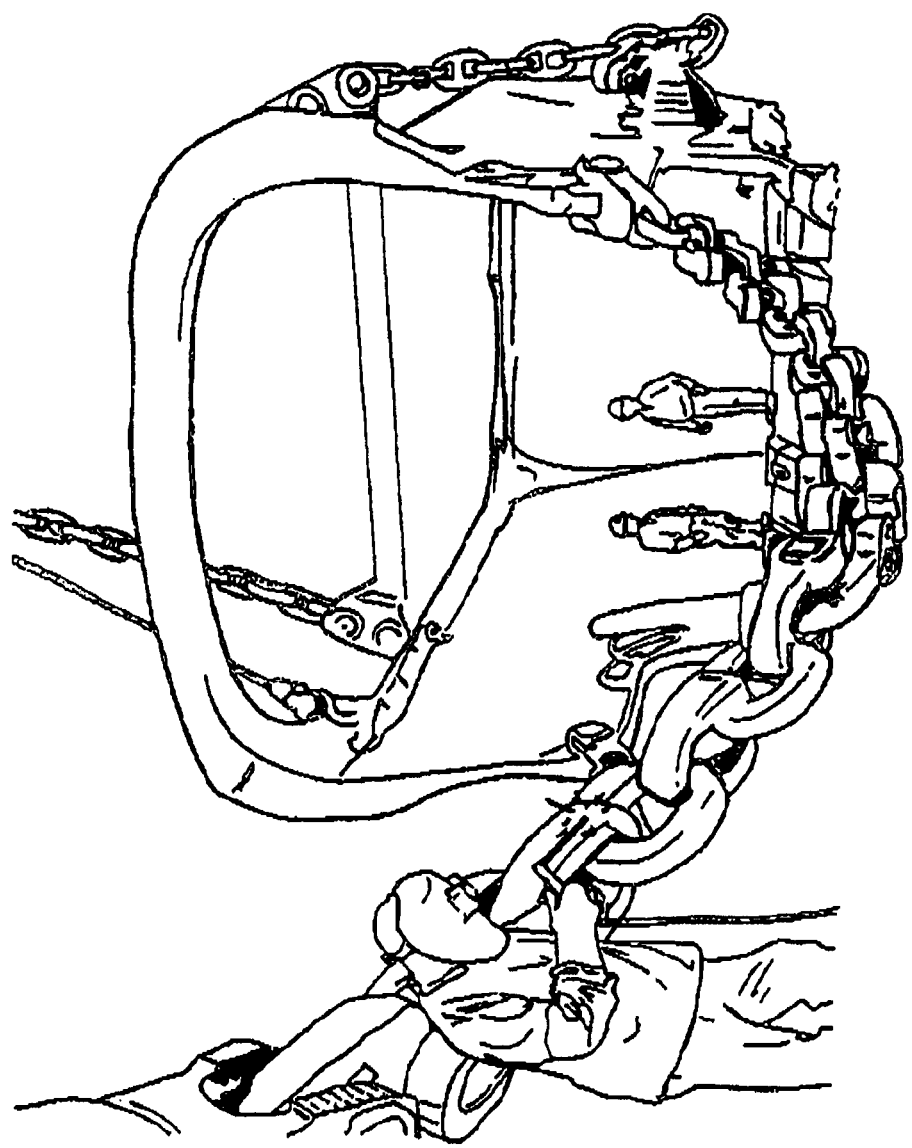
FIG. 3 is a pictorial view showing a conventional method used to repair wear crutches.
Figure 12:
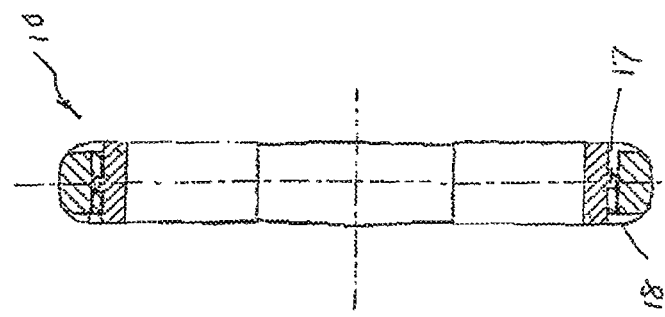
FIG. 12 is a side view of the chain link shown in FIG. 6 and whereby the upper portion is shown in cross-section along line C-C.

FIGS. 4, 5 and 12 show a linking member 10 having two opposing arm members 11 that are interconnected by two opposing, intermediate, looped end portions 12, said linking member being substantially symmetrical about both its longitudinal and transverse axes.

The arm members 11 diverge outwardly and away from the looped end portions 12 and whereby the enclosed angle between opposing arm members is approximately 20 degrees. Consequently the distance separating the opposing arm members is greatest in the mid portion of the linking member and smallest adjacent the looped end portions.

Each looped end portion 12 includes an inner or wear surface 13 that in use is to be protected against wear resulting from engagement with another linking member by a wear crutch 14 that is adapted to cover said inner surface.

On either side of the looped end portion 12 there is provided a crescent shaped recess 15 (see shaded areas of FIGS. 4 and 5) that is formed in the inner surface 13.

Each looped end portion 12 also includes two opposing, somewhat elongate, recesses or key seats 16, each having a rectangular shaped opening. The key seats 16 are formed in the inner surface 13, midway between opposing sides of the linking member 10 and partway along the length of the arm members 11.

Each looped end portion 12 also includes a centrally located slot 17 formed in the inner surface 13 that extends from one side of the linking member 10 to an opposing side of the linking member. The slot 17 has a substantially square shaped transverse cross-section.

The looped end portions 12 each also include two elongate grooves 18 that are each formed in a respective side face of the linking member 10. The grooves 18 each have a longitudinal axis and whereby these axes lie in the same plane containing the both the longitudinal axis of the linking member 10 and a longitudinal axis of the slot 17.

FIGS. 7 to 11 show a wear crutch 14 having two substantially parallel, somewhat plate like, guides 19 having an arcuate edge portion 20. The guides 19 are connected by an intermediate wear body 21.

The wear body 21 includes a first or outer, curved, surface 22 and a second or inner, curved, surface 23. The outer and inner curved surfaces 22 and 23 are located on opposite sides of the body 21 and whereby the two curved surfaces intersect one another at opposite ends of said body along common edge portions 24. The common edge portions 24 and the outer surface 22 are located between the guides 19, said guides being substantially perpendicular to a plane containing said edge portions.

The outer and inner surfaces 22 and 23 define a wear thickness there between that is thickest midway between the common end portions 19.

The wear crutch 14 also includes two, somewhat rectangular shaped, keys 25 that protrude out from the outer surface 22, said keys being located on opposite ends of the wear body 21 adjacent a common edge portion 24.

The wear crutch 14 also includes a square shaped peg 26 that protrudes out from the outer surface 22. The peg 26 is located midway between the common edge portions 24.

Figure 6:
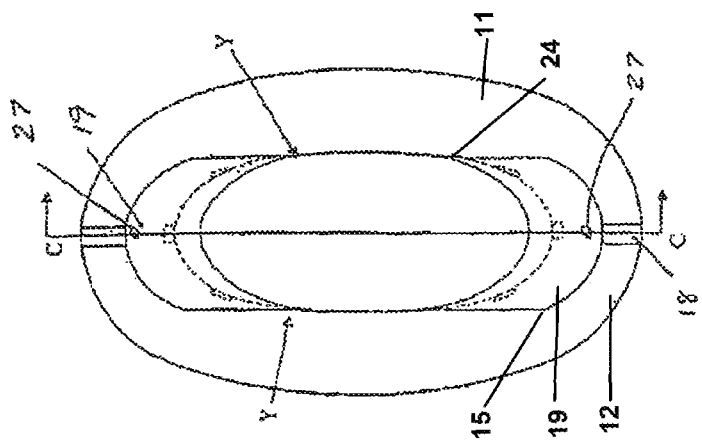
FIG. 6 is a front view of the chain-link to which there has been attached two wear crutches constructed in accordance with the present invention.
Figure 18:
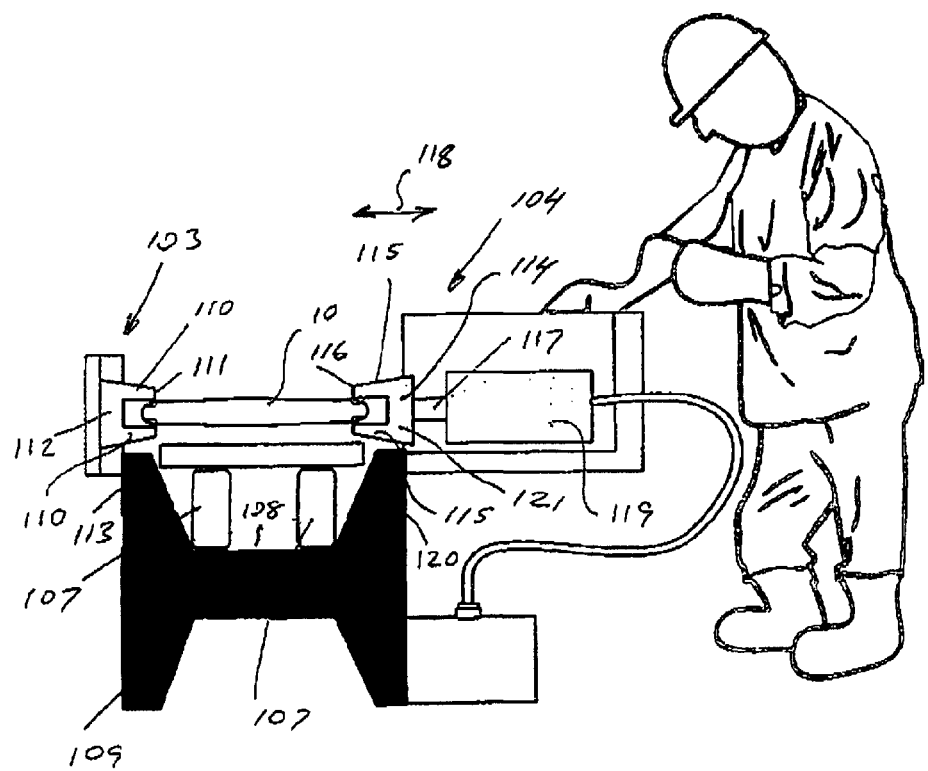
FIG. 18 is an end view of the wear crutch displacement apparatus shown in FIG. 15.
Figure 19:
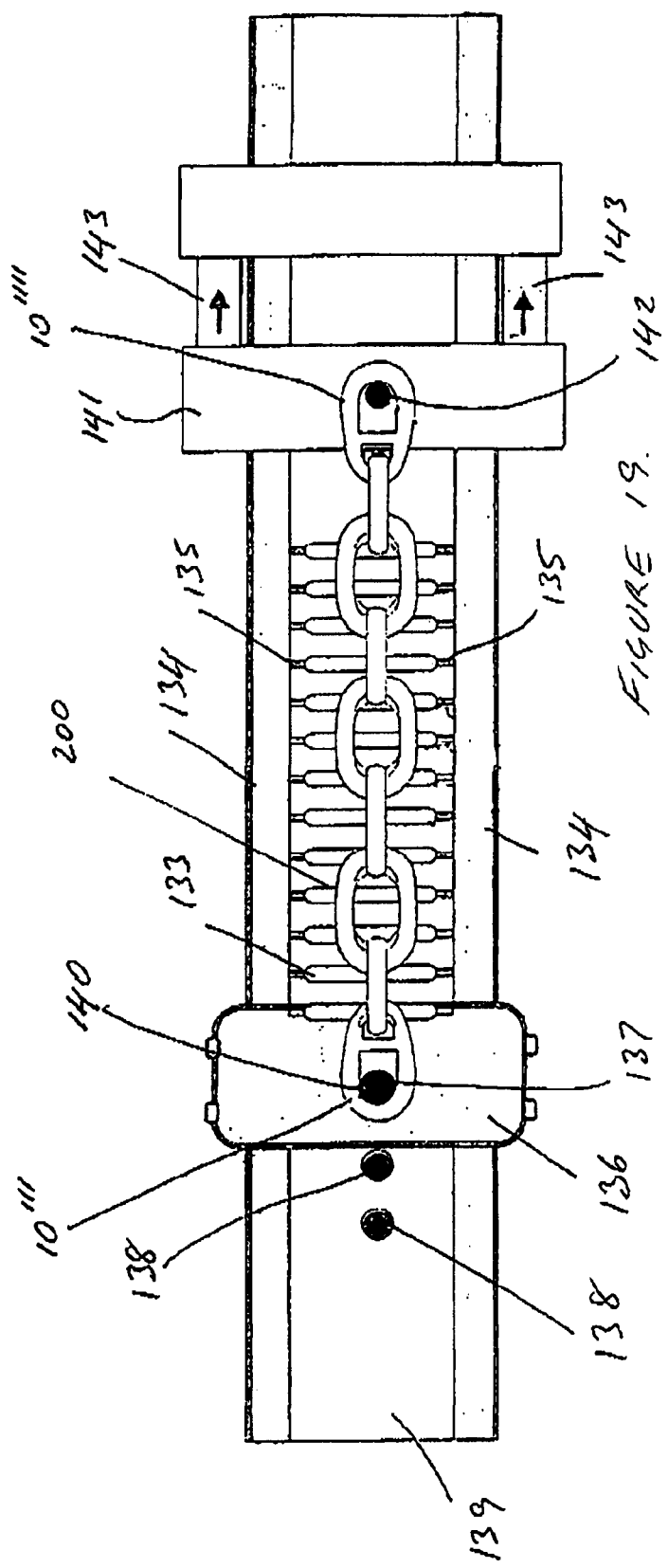
FIG. 19 is a plan view of the wear crutch bedding apparatus shown in FIG. 15.
Figure 21:
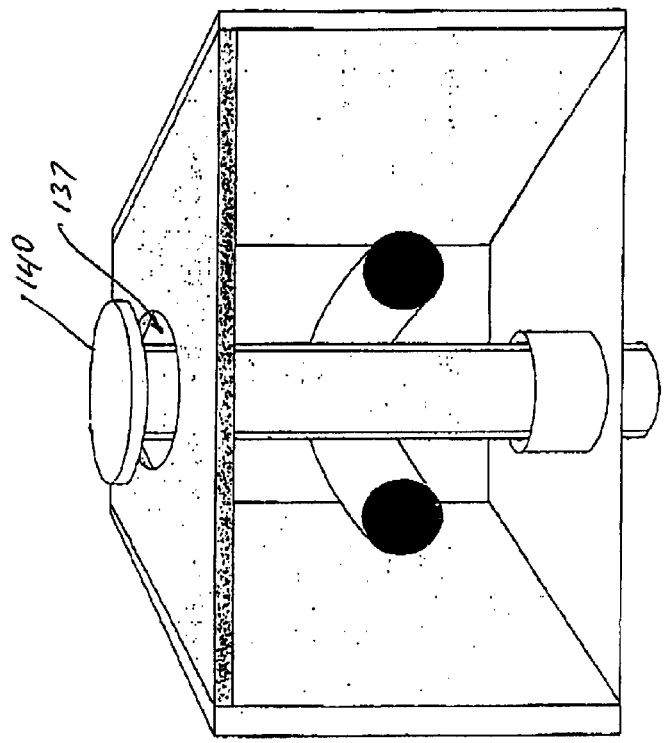
FIG. 21 is a sectional end view of a second linking member engagement means of the wear crutch bedding apparatus shown in FIG. 15.
Figure 20:
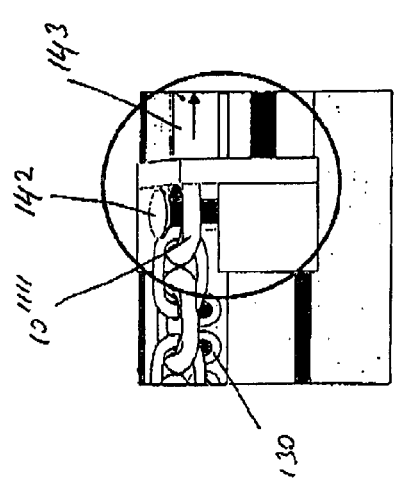
FIG. 20 is a sectional end view of a first linking member engagement means of the wear crutch bedding apparatus shown in FIG. 15.

FIGS. 6 and 12 show the linking member 10 two which there has been attached two opposing wear crutches 14. The outer surface 22, of each wear crutch 14, in use abuts against a respective inner surface 13 of the linking member 10.

Each wear crutch 14 is retained on a respective looped end portion 12 of the linking member 10 by a rolled steel pin 27 that is frictionally threaded through aligned guide apertures 28 formed in respective guides 19 and an aperture 29 formed in the looped end portion.

The guides 19, receivable within respective recesses 15, and the keys 25, receivable within respective key seats 16, aid in the correct location of the wear crutch 14 on the looped end portion 12 during the bedding process.

Further, when the wear crutch 14 is correctly bedded on the looped end portion 12, the common edge portions 24 shall engage a respective one of the adjacent arm members 11 in a manner whereby said edge portions and abutting inner surfaces of the arm members are substantially flush, as illustrated in FIG. 6.

It will be appreciated that the location of the guides 19 within respective recesses 15; the location of the keys within respective key seats 16, and the location of the peg 26 within the slot 17 all assist in preventing movement of the wear crutch 14 relative to the looped end portion 12 arising from engagement of the linking member 10 with another linking member, or such like, during use.

It is also believed that these multiple locating means will not only spread the load applied on the locating means but also prevent accidental movement of the wear crutch 10 during its removal.

In use, the inner surface 23, of the wear crutches 14 shall provide a sacrificial wear surface and whereby the inner surfaces 13 of the looped end portions 12 will be protected from wear. Further, it is envisaged that worn wear crutches 14 will be replaced by fresh wear crutches and that the replacement of worn wear crutches could be undertaken on a regular basis as part of a maintenance program that is intended to prolong the working life of the linking members 10 and thereby a chain, or such like comprising a plurality of interconnected linking members.

When the wear crutch 10 is properly located on the linking member, the respective common edge portions 15 of the wear crutch 14 are flush with an inner surface of the respective side arms of the linking member as illustrated in FIGS. 6 and 14 in the region indicated as "Y". The linking member used with the wear crutch 10 of the present invention is preferably specifically configured in order to ensure this flush fit.

An alternative linking member 30, in the form of a shackle, is illustrated in FIGS. 13 and 14. The shackle 30 includes two opposing arm members 11 and a single looped end portion 12 that is located between and is connected to adjacent ends of said arm members, while the opposing ends of the arm members are adapted to receive a pawl (not shown) to open and close the shackle.

Like the linking member 10, the arm members 11 of the shackle 30 diverge outwardly from the looped end portion 12 and whereby the enclosed angle between the opposing arm members is approximately 20 degrees.

FIGS. 15 and 16 show a combination wear crutch displacement apparatus 100 and a wear crutch bedding apparatus 101 located side by side one another.

The wear crutch displacement apparatus 100 includes displacement support means 102, that is capable of providing support for one or more linking members 10; linking member restraining means 103 for preventing relative movement of a selected one of the linking members 10 during the process of displacing a wear crutch 14 that is mounted on said linking member, and a wear crutch displacing tool 104.

The displacement support means 102 includes a rectangular shaped, plate like, support 105 having a substantially flat support surface 106. The support 105 is mounted on a plurality of wheels 107 that are each capable of rotational movement about an axle, not shown, within a channel 108 of a base 109.

The linking member restraining means 103 includes two opposing flanges 110, each having a free end portion 111. The flanges 110 are interconnected by an intermediate mounting portion 112 that is itself affixed to an elongate side rail 113 that is rigidly attached to the base 109.

The wear crutch displacing tool 104 includes a bifurcated head portion 114 consisting of two opposing terminal members 115 each having a free end portion 116.

The opposing ends of the two members 115 are interconnected by an intermediate bridging member 121 that is itself mounted on one end of a hydraulic ram consisting of a stem 117 that is capable of reciprocal movement in the direction of arrow 118 and whereby the stem is powered by a power source 119 that is rigidly mounted on a second elongate rail 120 that is substantially parallel and spaced from the first side rail 113. The side rail is also rigidly attached to the base 120.

The support 105 is located between the opposing side rails 113 and 120 and is capable of reciprocal movement along the length of the channel 108.

The wear crutch bedding apparatus 101 includes bedding support means 130 for supporting a linking member 10 or a plurality of interconnected linking members 10, such as a chain 200, during a wear crutch bedding process, a first linking member engagement means 131 and a second linking member engagement means 132 that is spaced from said first linking member engagement means.

The bedding support means 130 includes a plurality of cylindrically shaped rollers 133, each capable of rotational movement about a longitudinal axis. The rollers 133 are located between two opposing, substantially parallel side rails 134 and whereby each roller is connected to both side rails by an axle 135 about which said roller rotates.

The first linking member engagement means 131 includes a body 136 that is slidably mounted on both of the side rails 134 and whereby the body includes an aperture 137 formed therein that in use may be selectively aligned with one of a plurality of apertures 138 formed in a plate like member 139 that is located at a first end of the bedding apparatus, said plate like member being also located between and attached to the side rails 134.

The first linking member engagement means 131 also includes a post 140 having a lower end that is capable of being received in aligned apertures 137 and 138 so as to thereby fix the location of said first linking member engagement means relative to the bedding support means 130.

The upper end of the post 140 extends above the body 136. The second linking member engagement means 132 also includes a body 141 that is slidably mounted on both of the side rails 134 and is located at an opposite end of the bedding apparatus to that of the first linking member engagement means 131. Further, the body 141 includes a centrally located post 142 that stands proud of the body.

The body 141 is connected to two hydraulically operated ram assemblies 143 that when actuated shall move the second linking member engagement means 132 along the rails 134 and away from the first linking member engagement means.

In use, a chain 200, constructed in accordance with the present invention, consisting of a plurality of interconnected linking members 10, each having two opposing wear crutches 14 fitted to respective, adjacent, looped end portions 12, may be placed lengthwise on the support 205 such that adjacent linking members are substantially orthogonal, as illustrated in FIGS. 16 and 17.

Beginning with say the first linking member 10' of the chain 200, a first looped end portion 12' is positioned between the opposing flanges 110 such that each flange is at least partially received within a respective groove 18 and whereby the distal or free end of each flange 121 abuts against an arcuate edge portion 20 of a guide 19.

The opposing end portion 12" of the same linking member 10' is positioned between terminal members 115 such that each member is at least partially received within a respective groove 18 and whereby the distal end 116 of each member abuts against an arcuate edge portion 20 of a guide 19.

Actuation of the power source 119 shall cause the stem 117 to advance towards the restraining means 103 whereby the resulting force applied by the members 115 directly to the edge portions 20 of the wear crutch 14" shall be sufficient to displace said wear crutch relative to the looped end portion 12". Once this has occurred, subsequent engagement of the bridging member 121 with the looped end portion 12" shall result in a force applied by the flanges 110 to the wear crutch 14' sufficient to displace said wear crutch from the looped end portion 12'.

Having disengaged the linking member 10' from the restraining means 103 and the displacing tool 204, the displaced wear crutches 14' and 14" of the first linking member 10' may be removed and replaced with fresh wear crutches.

This process may be repeated for every second one of the linking members in the chain by moving the displacement support means along the channel 108 such that the said linking members in turn are aligned with the retraining means 103 and the displacement tool 104.

Once the wear crutches on every second linking member have been displaced and subsequently replaced, the chain 200 may be repositioned on the displacement support such that the linking members that were previously lying substantially parallel to the rails 113 and 120 are now substantially orthogonal thereto and visa versa.

Once all of the worn wear crutches have been replaced by fresh wear crutches, said fresh wear crutches being only partially located on the linking members, the adjacent bedding apparatus may be used to bed said fresh wear crutches.

The chain 200 is therefore moved across and placed on the bedding support means 130, such that it is generally supported lengthwise on the rollers 133, as shown in FIG. 16.

The first linking member 20''' is placed over the upstanding end of the post 140 such that it is retained on said post. The last linking member 10'''' of the chain 200 is placed over the upstanding post 142 such that it is retained on said post.

The operator then actuates the ram assemblies 143 such that the distance separating the first and second linking member engagement means 131 and 132 is increased whereby as a consequence of the forces applied to the linking members by said engagement means the linking members are generally aligned with one another and the wear crutches are pulled into their bedded position.

It is believed that by providing wear crutches 14 that are made of a material that is harder than the material from which the linking members are made from, the resulting chain will last longer than prior art chains and that the use of the replaceable wear crutches will significantly reduce the time and labour previously required to rebuild a worn chain.

The claims defining the invention are as follows:

1. A wear crutch for a linking member of the type having two opposing arms that are interconnected by two intermediate looped end portions, the opposing arms diverge outwardly away from the looped end portions, the distance separating the opposing arms being greatest at a mid-portion of the linking member and smallest adjacent the looped end portions, said wear crutch including:
    two opposing guides connected by an intermediate wear body, said wear body having a first or outer, curved, surface and a second or inner, curved surface, said outer and inner curved surfaces being located on opposite sides of said body, and whereby said two curved surfaces intersect one another at opposite ends of said body along common edge portions, said common edge portions and said outer surface being located between said guides, said guides being substantially perpendicular to a plane containing said edge portions, whereby in use said inner and outer curved surfaces define a wear thickness therebetween, said outer surface bears against one of the looped end portions of the linking member and said edge portions each engage a respective one of the opposing arms in a substantially flush manner, and whereby said guides assist in the location of said wear body relative to the looped end portion that is located there between.

2. The wear crutch as claimed in claim 1, wherein said guides and said outer surface of said wear body define a channel and whereby the wear crutch includes locating means in the channel to assist with the positive location of the wear crutch on the linking member.

3. The wear crutch as claimed in claim 2, wherein said locating means includes two opposing keys that each protrude from said outer surface of said wear body.

4. The wear crutch as claimed in claim 2 wherein said locating means includes a spigot that protrudes from said outer surface of said wear body, said spigot being located midway between said common edge portions.

5. An improved linking member having two opposing arms that are interconnected to two intermediate looped end portions wherein said opposing arms diverge outwardly away from said looped end portions, the distance separating said opposing arms being greatest at a mid-portion of said linking member and smallest adjacent said looped end portions, said linking member includes:
    a wear crutch having two opposing guides connected by an intermediate wear body, said wear body having a first curved surface and a second curved surface, said first and second curved surfaces being located on opposite sides of said wear body, and whereby said two curved surfaces intersect one another at opposite ends of said wear body along common edge portions, said common edge portions and said first curved surface being located between said guides whereby in use said second and first curved surfaces define a wear thickness there-between and said first surface shall bear against said inner surface of said looped end portion, said edge portions shall each engage a respective one of said opposing arms in a manner whereby adjacent edge portions and inner surfaces are substantially flush, and whereby said guides assist in the location of said wear body relative to said looped end portion that is located there between.

6. The improved linking member as claimed in claim 5, wherein said guides and said outer surface of said wear body define a channel and whereby the wear crutch includes at least one protrusion located in the channel that is adapted to be received within a recess formed in said looped end portion.

7. A linking member for use in conjunction with a wear crutch of the type having two opposing guides connected by an intermediate wear body, said wear body having a first or outer, curved surface and a second or inner, curved surface, said outer and inner curved surfaces being located on opposite sides of said body, and whereby said two curved surfaces intersect one another at opposite ends of said body along common edge portions, said common edge portions and said outer surface being located between said guides whereby in use said inner and outer curved surfaces define a wear thickness there between, said linking member including:

two opposing arms that are interconnected by two intermediate looped end portions and whereby respective inner surfaces of said arms and one or both of said looped end portions define a friction surface, wherein said inner surfaces of said arms diverge outwardly away from said looped end portions, the distance separating the opposing arms being greatest at a mid-portion of the linking member and smallest adjacent said looped end portions such that when the wear crutch is fitted to said linking member the outer surface of the wear crutch bears against said inner surface of one of said looped end portions and the edge portions shall each engage said adjacent arm such that respective edge portions and said adjacent inner surfaces of said opposing arms are substantially flush, and whereby the guides assist in the location of the wear body relative to the said looped end portion that is located there-between.

8. A linking member for use in conjunction with a wear crutch of the type having two opposing guides connected by an intermediate wear body, said wear body having a first or outer, curved surface and a second or inner, curved surface, said outer and inner curved surfaces being located on opposite sides of said body, and whereby said two curved surfaces intersect one another at opposite ends of said body along common edge portions, said common edge portions and said outer surface being located between said guides whereby in use said inner and outer curved surfaces define a wear thickness therebetween, said linking member including:

two opposing arms that are interconnected by an intermediate looped end portion and whereby respective inner surfaces of said arms and said looped end portion define a friction surface, wherein said inner surfaces of said arms diverge outwardly from said inner surface of said looped end portion such that when the wear crutch is fitted to said linking member the outer surface of the wear crutch shall bear against said inner surface of said looped end portion and the edge portions shall each engage said adjacent arm such that respective edge portions and said adjacent inner surfaces of said opposing arms are substantially flush, and whereby the guides assist in the location of the wear body relative to said looped end portion that is located therebetween;

wherein a distance separating the opposing arms is greatest at a mid-portion of the linking member and smallest adjacent the looped end portion.

9. A crutch displacement apparatus for assisting with the removal of a wear crutch that is mounted on a linking member, said linking member having two opposing arm members that are interconnected by an intermediate looped end portion, and whereby said wear crutch includes two opposing guides connected by an intermediate wear body, said wear body having a first curved surface and a second curved surface, said first and second curved surfaces being located on opposite sides of said wear body, and whereby said two curved surfaces intersect one another at opposite ends of said wear body along common edge portions, said common edge portions and said first curved surface being located between said guides and whereby when said wear crutch is mounted on said linking member said first curved surface bears against said inner surface of said looped end portion and said edge portions each engage a respective one of said opposing arm members in a manner whereby adjacent edge portions and inner surfaces are substantially flush and whereby said guides assist in the location of said wear body relative to said looped end portion that is located there-between, said crutch removal apparatus including:

displacement support means capable of providing support for at least one linking member during a crutch displacement operation;

linking member restraining means associated with said support means for preventing movement of the linking member relative to said support means; and at least one crutch displacement tool associated with said support means and/or said restraining means, said crutch displacement tool being adapted to at least displace the wear crutch that is mounted on the linking member while the linking member is supported by said support means and restrained from movement relative to said support means by said restraining means.

10. A crutch bedding apparatus for assisting with the bedding of a wear crutch that is already partially located on a linking member, said linking member having two opposing arm members that are interconnected by an intermediate looped end portion, and whereby said wear crutch includes two opposing guides connected by an intermediate wear body, said wear body having a first curved surface and a second curved surface, said first and second curved surfaces being located on opposite sides of said wear body, and whereby said two curved surfaces intersect one another at opposite ends of said wear body along common edge portions, said common edge portions and said first curved surface being located between said guides and whereby when said wear crutch is mounted on said linking member said first curved surface bears against said inner surface of said looped end portion and said edge portions each engage a respective one of said opposing arm members in a manner whereby adjacent edge portions and inner surfaces are substantially flush and whereby said guides assist in the location of said wear body relative to said looped end portion that is located there between, said crutch bedding apparatus including:

bedding support means for supporting at least one linking member during a crutch bedding operation;

first linking member engagement means that is adapted to engage either a portion of the linking member or a wear crutch that is associated with the linking member when the linking member is supported on said bedding support means;

second linking member engagement means that is capable of engaging either another portion of the same linking member and/or a wear crutch associated with said other portion, or another linking member connected to the first linking member and/or a wear crutch associated with that other linking member; and separating means for increasing the distance separating said first linking member engagement means and said second linking member engagement means whereby in use a force may be applied to the linking member or all of the linking members located between said first and said second linking member engagement means sufficient to bed the wear crutch or all of the wear crutches that are partially located on the linking members by increasing the distance separating said first linking member engagement means and said second linking member engagement means.

11. The method of displacing a wear crutch that is mounted on a linking member, said method including:

providing a crutch displacement apparatus of the type defined in claim 9;

placing the linking member on the linking member support means;

employing the linking member restraining means to prevent movement of the linking member relative to the displacement support means during the displacement of the wear crutch; and actuating the crutch displacement tool whereby engagement of the crutch displacement tool with the wear crutch shall result in the displacement of said wear crutch relative to the restrained linking member.

12. The method of bedding a wear crutch on a linking member, said bedding method including:

providing a crutch bedding apparatus of the type defined in claim 10;

laying a linking member on the bedding support means, said linking member having a first, looped, end portion, an opposing second end portion, and a wear crutch partially located against said looped end portion;

engaging the wear crutch with either the first linking member engagement means or the second linking member engagement means;

engaging the second end portion of the linking member with which ever linking member engagement means chat is not engaging the wear crutch; and actuating the separating means so that the two linking member engagement means are urged apart and whereby forces are applied to the wear crutch and the second end portion sufficient to bed the wear crutch against the first, looped, end portion of the linking member.

13. A combined crutch displacement and crutch bedding apparatus for assisting with the removal and replacement of a wear crutch that is mounted on a linking member and the subsequent bedding of a replacement wear crutch that is already partially located on the linking member, said linking member having two opposing arm members that are interconnected by an intermediate looped end portion, and whereby said wear crutch includes two opposing guides connected by an intermediate wear body, said wear body having a first curved surface and a second curved surface, said first and second curved surfaces being located on opposite sides of said wear body, and whereby said two curved surfaces intersect one another at opposite ends of said wear body along common edge portions, said common edge portions and said first curved surface being located between said guides and whereby when said wear crutch is mounted on said linking member said first curved surface bears against said inner surface of said looped end portion and said edge portions each engage a respective one of said opposing arm members in a manner whereby adjacent edge portions and inner surfaces are substantially flush and whereby said guides assist in the location of said wear body relative to said looped end portion that is located there-between, said combined crutch displacement and crutch bedding apparatus including:

displacement support means capable of providing support for at least one linking member during a crutch displacement operation;

linking member restraining means associated with said support means for preventing movement of the linking member relative to said support means;

at least one crutch displacement tool associated with said support means and/or said restraining means, said crutch displacement tool being adapted to at least displace the wear crutch that is mounted on the linking member while the linking member is supported by said support means and restrained from movement relative to said support means by said restraining means;

bedding support means for supporting at least one linking member during a crutch bedding operation;

first linking member engagement means that is adapted to engage either a portion of the linking member or a wear crutch that is associated with the linking member when the linking member is supported on said bedding support means;

second linking member engagement means that is capable of engaging either another portion of the same linking member and/or a wear crutch associated with said other portion/or another linking member connected to the first linking member and/or a wear crutch associated with that other linking member; and separating means for increasing the distance separating said first linking member engagement means and said second linking member engagement means whereby in use a force may be applied to the linking member or all of the linking members located between said first and said second linking member engagement means sufficient to bed the wear crutch or all of the wear crutches that are partially located on the linking members by increasing the distance separating said first linking member engagement means and said second linking member engagement means.

14. An improved linking member and a crutch displacement apparatus for assisting with the removal of a wear crutch that is mounted on the linking member, including:

a linking member having two opposing arm members that are interconnected at one end by an intermediate looped end portion and at an opposing end by a second end portion;

a wear crutch having two opposing guides connected by an intermediate wear body, said wear body having a first curved surface and a second curved surface, said first and second curved surfaces being located on opposite sides of said wear body, and whereby said two curved surfaces intersect one another at opposite ends of said wear body along common edge portions, said common edge portions and said first curved surface being located between said guides and whereby when said wear crutch is mounted on said linking member said first curved surface bears against said inner surface of said looped end portion and said edge portions each engage a respective one of said opposing arm members in a manner whereby adjacent edge portions and inner surfaces are substantially flush and whereby said guides assist in the location of said wear body relative to said looped end portion that is located there-between;

a crutch removal apparatus having displacement support means capable of providing support for said linking member during a crutch displacement operation;

linking member restraining means associated with said support means; and at least one crutch displacement tool associated with said support means and/or said restraining means, whereby said crutch displacement tool is in engagement with said wear crutch and said restraining means is in engagement with said second end portion of said linking member.

15. An improved linking member and a crutch bedding apparatus for assisting with the bedding of a wear crutch that is partially located on the linking member, including:

a linking member having two opposing arm members that are interconnected at one end by an intermediate looped end portion and at an opposing end by a second end portion;

a wear crutch having two opposing guides connected by an intermediate wear body, said wear body having a first curved surface and a second curved surface, said first and second curved surfaces being located on opposite sides of said wear body, and whereby said two curved surfaces intersect one another at opposite ends of said wear body along common edge portions, said common edge portions and said first curved surface being located between said guides and whereby when said wear crutch is mounted on said linking member said first curved surface bears against said inner surface of said looped end portion and said edge portions each engage a respective one of said opposing arm members in a manner whereby adjacent edge portions and inner surfaces are substantially flush and whereby said guides assist in the location of said wear body relative to said looped end portion that is located there-between;

first linking member engagement means;

second linking member engagement means;

bedding support means for supporting said linking member during a crutch bedding operation, and separating means for increasing the distance separating said first linking member engagement means and said second linking member engagement means, and whereby said wear crutch is engaged with either said first linking member engagement means or said second linking member engagement means while said second end portion is operatively connected to which ever linking member engagement means that is not engaged with said wear crutch.

16. A chain that includes:

a linking member having two opposing arms that are interconnected by two intermediate looped end portions wherein said opposing arms diverge outwardly away from said looped end portions, the distance separating said opposing arms being greatest at a mid-portion of said linking member and smallest adjacent said looped end portions, whereby respective inner surfaces of said opposing arms and an inner surface of one of each of said looped end portions define a friction surface; and a wear crutch having two opposing guides connected by an intermediate wear body, said wear body having a first curved surface and a second curved surface, said first and second curved surfaces being located on opposite sides of said wear body, and whereby said two curved surfaces intersect one another at opposite ends of said wear body along common edge portions, said common edge portions and said first curved surface being located between said guides whereby in use said second and first curved surfaces define a wear thickness there-between and said first surface bears against said inner surface of the said looped end portion having a friction surface, said edge portions shall each engage a respective one of said opposing arms in a manner whereby adjacent edge portions and inner surfaces are substantially flush, and whereby said guides assist in the location of said wear body relative to said looped end portion that is located there between.

* * * * *